United States Patent [19]

Satoh

[11] Patent Number: 5,001,709
[45] Date of Patent: Mar. 19, 1991

[54] COMMUNICATION SYSTEM AND APPARATUS
[75] Inventor: Makoto Satoh, Tokyo, Japan
[73] Assignee: Canon Kabushiki Kaisha, Tokyo, Japan
[21] Appl. No.: 307,506
[22] Filed: Feb. 8, 1989
[30] Foreign Application Priority Data Feb. 9, 1988 [JP] Japan ................................ 63-026658
Feb. 9, 1988 [JP] Japan ................................ 63-026659

[51] Int. Cl.⁵ ............................................. H04J 3/12
[52] U.S. Cl. ..................................... 370/110.1; 370/92
[58] Field of Search ................. 370/92, 110.1, 94.1, 370/60; 379/93, 94, 96, 142, 373, 375, 376

[56] References Cited
U.S. PATENT DOCUMENTS

4,740,955 4/1988 Litterer et al. ................. 370/85.11
4,837,807 6/1989 Szeto et al. ......................... 379/93

Primary Examiner—Douglas W. Olms
Assistant Examiner—Christopher O. Edwards
Attorney, Agent, or Firm—Fitzpatrick, Cella, Harper & Scinto

[57] ABSTRACT

Communication type identification data and message data are sent to a called (call incoming side) apparatus during a communication path formation operation with a desired destination apparatus through a communication medium. The destination apparatus identifies the identification data, and generates different ringing tones corresponding to communication types. When the destination apparatus receives a message, it simultaneously displays the message. A receiving party can easily discriminate the communication types, and can take appropriate reactions, thus allowing efficient response without requiring unnecessary answering process.

9 Claims, 11 Drawing Sheets

COMMUNICATION SYSTEM AND APPARATUS

BACKGROUND OF THE INVENTION

1. Field of the Invention

The present invention relates to a communication system and apparatus for performing data communication through a digital communication network, e.g., an ISDN having a plurality of data channels and a control channel.

2. Prior Art

As a widely used terminal apparatus connected to a telephone network, a telephone terminal apparatus mainly using speech data is known. However, along with recent development of the communication techniques, a facsimile apparatus as a terminal which can exchange both image data and character data, and a personal computer comprising a modem are widely used.

Of these terminals, a terminal apparatus which can exchange both speech data and non-speech data like a facsimile apparatus with a telephone set is also available.

When a terminal apparatus of this type connected to the telephone network calls another terminal apparatus, the telephone network selects a designated called (call incoming side) terminal apparatus, and sends a call (ringing) signal to the called terminal apparatus. Upon reception of the call signal, the called apparatus detects that it is being called, and executes corresponding call incoming processing.

When a connecting request (call request) is made to a terminal apparatus of this type connected to the telephone network, the telephone network sends a call (ringing) signal to the requested terminal apparatus.

However, the called terminal apparatus receives only the call (ringing) signal, and can only determine that it is being called. As a result, it cannot discriminate where and what type of terminal apparatus transmitted the calling signal.

More specifically, at this time, the called terminal apparatus and a plurality of receiving parties who utilize the called terminal apparatus cannot discriminate who should receive reception data and the like.

For this reason, someone must answer the phone to identify a receiving party who is to receive data, resulting in time-consuming operation.

For example, when an operator makes a call from a telephone to another facsimile apparatus with a telephone for the purpose of verbal communication (speech communication), if the called facsimile apparatus with the telephone is set in an automatic reception mode, communication by means of the telephone cannot be performed, and digital data communication is immediately started.

One subscriber's line and a plurality of terminals can be connected to an ISDN (integrated service digital network). The present applicant filed, as Japanese Patent Application No. 62-316003, an application of an invention to change a ringer for calling an operator based on a subaddress (a command for selecting one of the plurality of terminals) sent from a terminal on the other end of a line. An operator can recognize the designated terminal through the signal sent by the terminal on the other end of the line. However, when one terminal is used by a plurality of operators, a designated terminal can be recognized but it cannot be recognized to whom of the plurality of operators the incoming call is made.

SUMMARY OF THE INVENTION

It is an object of the present invention to solve the conventional problems, mentioned above.

It is another object of the present invention to improve a communication system for performing data communication through the ISDN.

It is still another object of the present invention to provide a communication apparatus which can send a message to an apparatus on the other end of a line before a connection is made to the apparatus.

It is still another object of the present invention to provide a communication apparatus which can add a message to an apparatus on the other end of a line to a call originating request command.

It is still another object of the present invention to provide a communication apparatus which can display a message on the basis of a call originating request command received from an apparatus on the other end of a line.

It is still another object of the present invention to provide a communication apparatus which can add a message to an apparatus on the other end of a line to a call originating request command, and can display a message on the basis of a call originating request command received from the apparatus on the other end of a line.

Figure 1A:
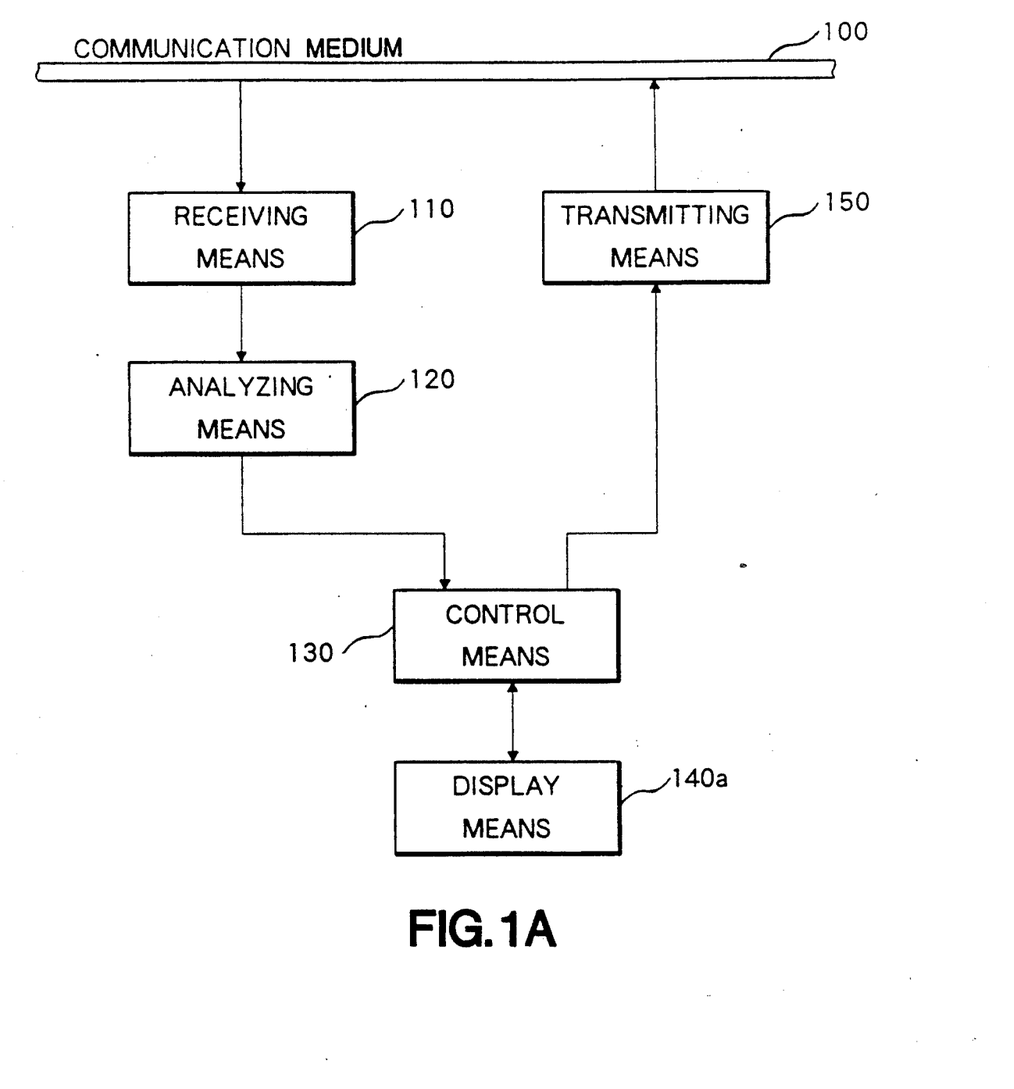
FIGS. 1A and 1B are schematic functional block diagrams of the present invention.

To attain the above-mentioned objects, according a preferred embodiment of the present invention, the communication system comprises an arrangement shown in the block diagram of FIG. 1A. More specifically, a communication system which is connected through a communication medium 100 having a plurality of data channels and a control channel and which transfers a call control signal using the control channel of the communication medium 100, comprises a receiving means 110 for receiving a control signal from the control channel, an analyzing means 120 for analyzing data received at the receiving means 110, a control means 130 for controlling the entire system in accordance with the analysis result of the analyzing means 120, a display means 140a for displaying a message received at the receiving means, and a transmitting means 150 for transmitting control data and the like to the communication medium 100.

In the above arrangement, a calling terminal apparatus adds a message portion destined to a called terminal apparatus and sends the command from the transmitting means 150 to the called terminal apparatus. When the analyzing means 120 of the called terminal apparatus receives the call originating request command from the calling terminal apparatus, the control means 130 causes the display means 140a to display the content of the message stored in the message portion in the call originating request command during a call incoming operation.

For example, a calling party inputs the specific name of one of a plurality of receiving parties who utilize the called (call incoming side) terminal apparatus, and the called terminal apparatus displays the input result, thus allowing recognition of the actual receiving party.

It is still another object of the present invention to provide a data communication apparatus which can easily recognize whether or not a message is sent from an apparatus on the other end of a line.

Figure 1B:
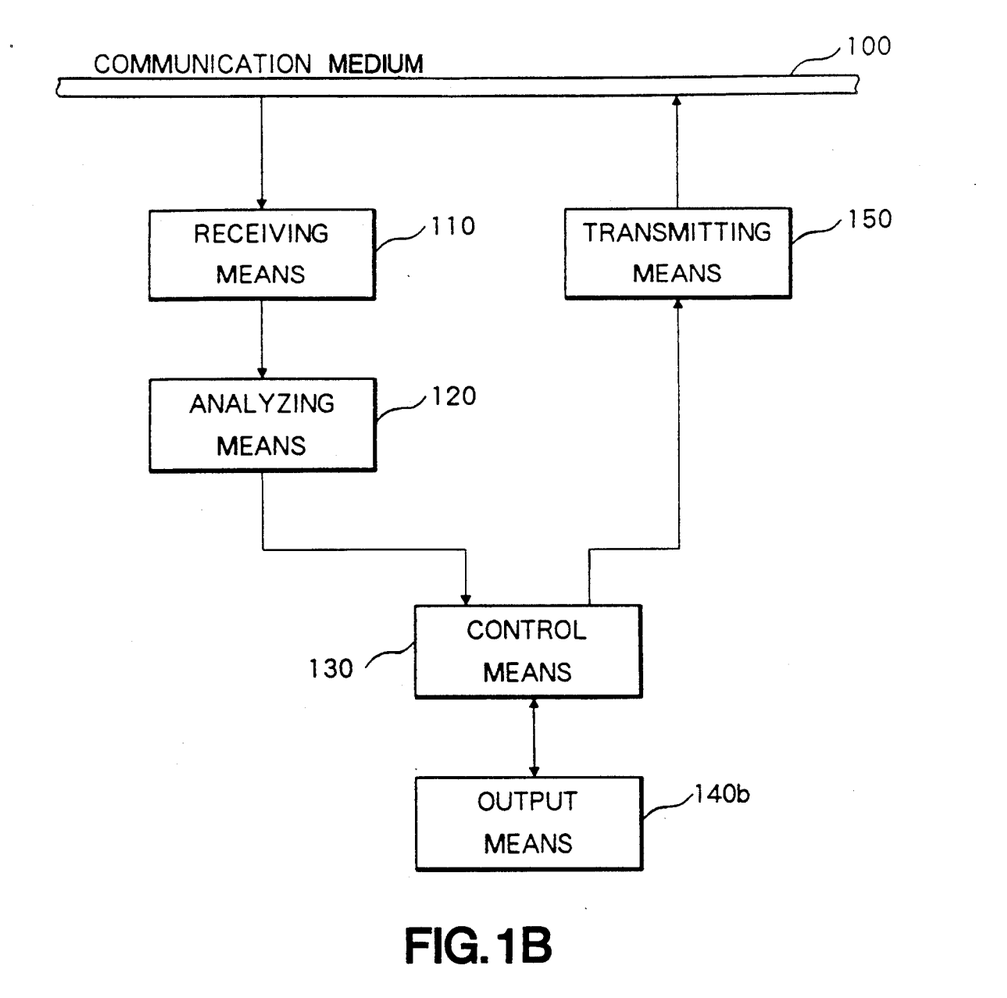

To attain the above-mentioned object, according to a preferred embodiment of the present invention, the data communication apparatus partially comprises the arrangement shown in the block diagram of FIG. 1B.

More specifically, the data communication apparatus comprises a receiving means 110 for receiving a control signal sent through a line 100, an analyzing means 120 for analyzing whether or not data received at the receiving means 110 includes a message, a control means 130 for controlling the entire apparatus in accordance with the analysis result of the analyzing means 120, and an output means 140b for outputting an acoustic signal corresponding to the analysis result of the analyzing means 120.

In the above arrangement, when the analyzing means 120 detects a call originating request command from another communication apparatus, the output means 140b outputs an acoustic signal corresponding to whether or not the call originating request command includes a message.

Thus, a receiving party of a called apparatus can easily take necessary response to an incoming call.

Other features and advantages of the present invention will be apparent from the following description take in conjunction with the accompanying drawings, in which like reference characters designate the same or similar parts throughout the figures thereof.

BRIEF DESCRIPTION OF THE DRAWINGS

FIGS. 6A, 6B, and 6C and FIGS. 8A and 8 Bare flow charts showing call originating processing of a calling apparatus, in which

DETAILED DESCRIPTION OF THE PREFERRED EMBODIMENTS

An embodiment according to the present invention will now be described with reference to the accompanying drawings.

(First Embodiment)

Figure 2:
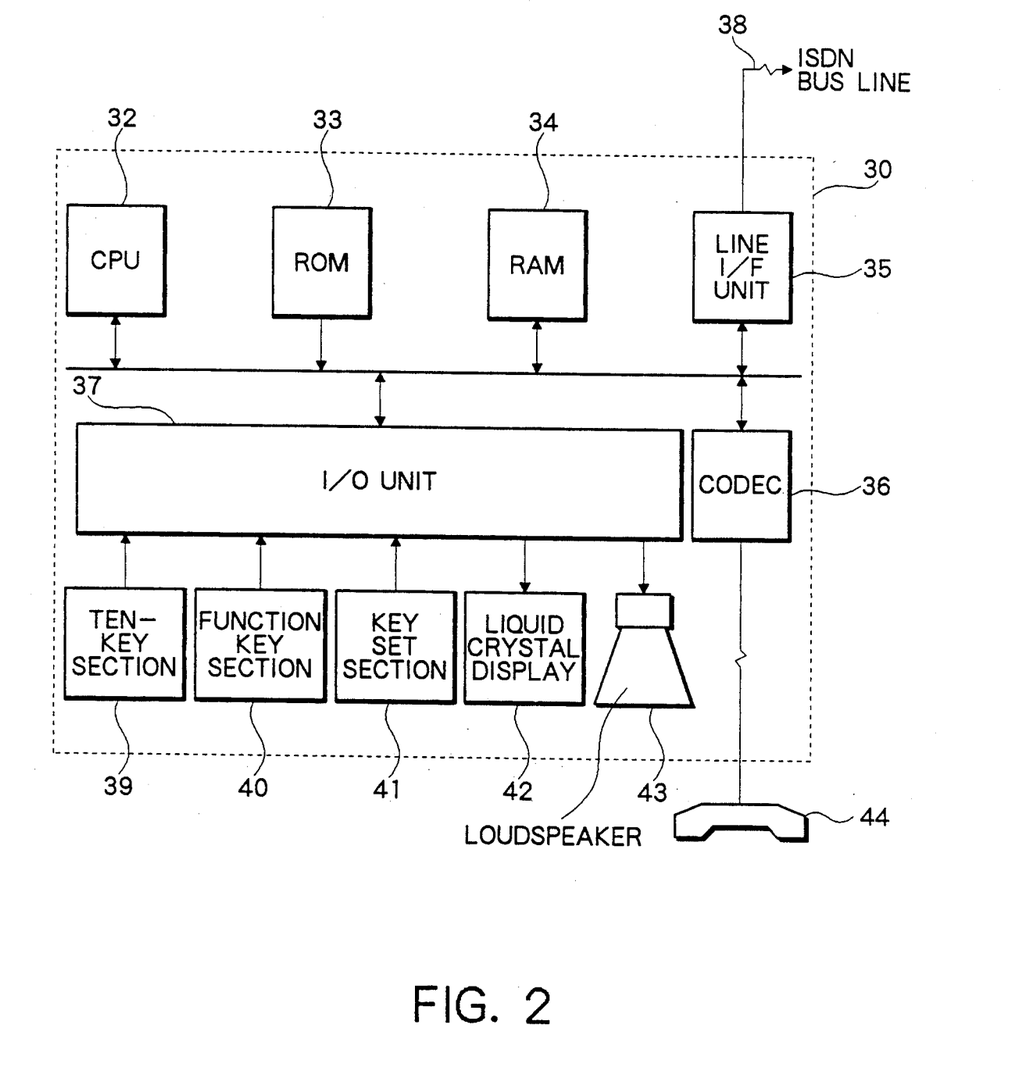
FIG. 2 is a block diagram of an embodiment of the present invention.

FIG. 2 is a block diagram showing an arrangement of a digital telephone apparatus according to an embodiment of the present invention.

According to this embodiment, the digital telephone apparatus comprises a digital telephone apparatus body 30, and a handset 44 which is attached to the body 30 and serves as a talking transmission/reception telephone set.

The digital telephone apparatus body 30 has the following arrangement.

More specifically, the body 30 comprises a CPU 32 as a central processing unit (control unit) for controlling the entire apparatus of this embodiment in accordance with programs stored in a ROM 33 and shown in FIGS. 6A to 6C and FIGS. 7, 8A and 8B (to be described later), the ROM 33 for storing the above-mentioned programs and parameters used in this embodiment a RAM 34 for temporarily storing intermediate processing result data of the CPU 32, communication data, and the like, a line I/F unit 35 for controlling interface with a connecting ISDN line 38, a CODEC 36 for performing analog-to-digital (A/D) conversion for allowing a verbal communication using the handset 44 with the ISDN line through the line I/F unit 35, an I/O unit 37 for controlling operation sections connected to the apparatus of this embodiment, and the operation sections 39 to 43.

Note that the line I/F unit 35 performs multiple separation of data channels and a control channel, clock synchronization, terminal contention control, and the like in order to perform interface with the connecting line 38 to the ISDN. These control operations comply with the CCITT standards as the international standards.

The I/O unit 37 is connected to a ten-key section 39 for inputting a telephone number and the like as the operation section, a function key section 40 for selecting various functions, a key set section 41 for inputting characters, a liquid crystal display 42 capable of displaying character data such as reception data, and a loudspeaker 43. The I/O unit 37 performs I/O control of these sections.

Figure 3:
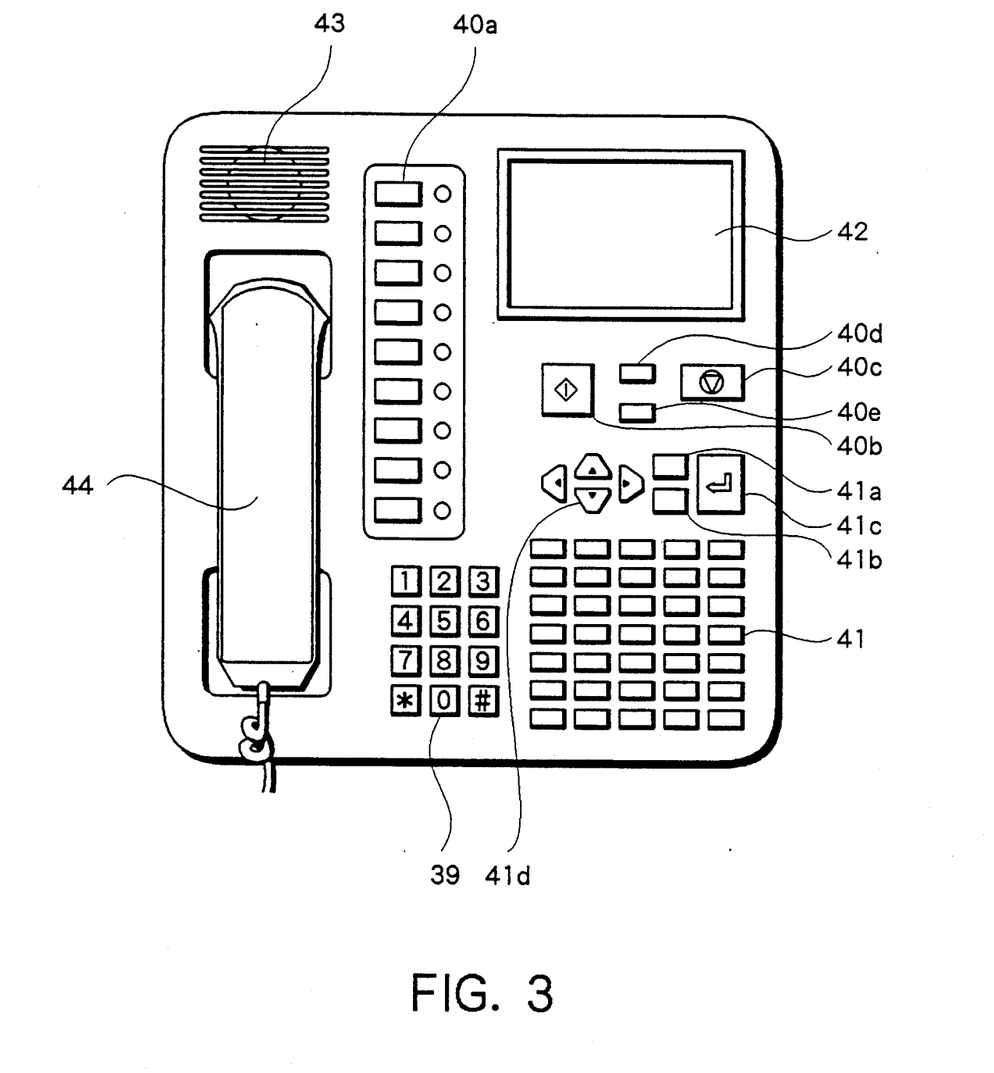
FIG. 3 is a top view showing an outer appearance of the embodiment shown in FIG. 2.

FIG. 3 shows the outer appearance of the digital telephone apparatus of this embodiment including the operation sections 39 to 43.

The same reference numerals in FIG. 3 denote the same parts as in FIG. 2, and a detailed description thereof will be omitted.

In the function key section 40 shown in FIG. 3, reference numeral 40a denotes a line selection button for selecting an arbitrary one of a plurality of lines accommodated in the telephone apparatus and connecting (or capturing) the selected line to the self apparatus; 40b, a transmission start instruction button for starting transmission of input data, and the like; 40c, an interruption instruction button for instructing interruption of communication; 40d, a message transfer key for instructing transfer of only a message; and 40e, a verbal communication function key for instructing execution of verbal communication.

As shown in FIG. 3, the key set section 41 of this embodiment includes control keys used for editing, such as an insert key 41a, a delete key 41b, a return key 41c, cursor keys 41d, and the like in addition to basic character keys. Using these keys and the liquid crystal display 42 for displaying an input result, and the like, a message can be edited.

Figure 4:
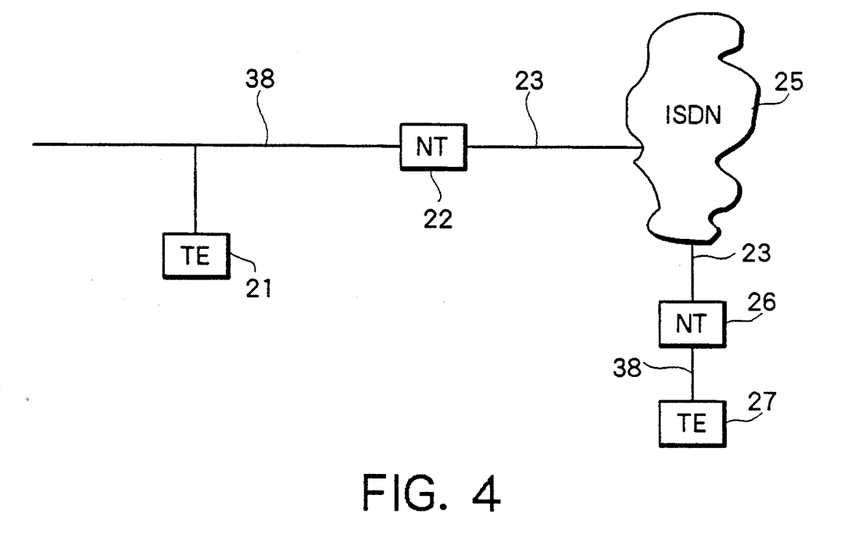
FIG. 4 is a block diagram showing a system comprising an ISDN to which the apparatus of this embodiment is connected.

FIG. 4 shows the system arrangement of a communication system to which this embodiment comprising the above-mentioned arrangement.

FIG. 4 shows a state wherein the apparatus of this embodiment is connected to the ISDN. In FIG. 4, reference numeral 21 denotes a digital telephone apparatus as a terminal apparatus of this embodiment; 22, a network termination apparatus; 23, a subscriber's line for connecting the ISDN and the network termination apparatus 22; 38, a bus line for connecting the digital telephone apparatus 21 and the network termination apparatus 22; 26, another network termination apparatus connected to the ISDN; and 27, another digital telephone apparatus.

As is well known, the ISDN line is multiplexed, and consists of one control channel and a plurality of data channels.

Figure 5:
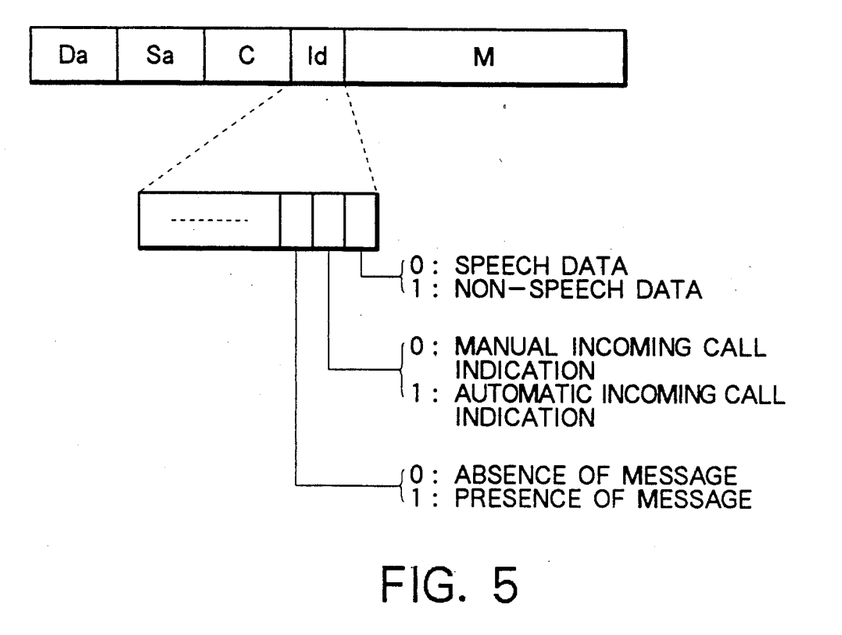
FIG. 5 is a view showing a frame format of a call originating request command used in the system of this embodiment.

FIG. 5 shows a frame format of a call originating request command which is sent from the apparatus of this embodiment onto the control channel (D channel) using the ISDN 25 shown in FIG. 4.

In FIG. 5, reference symbol Da denotes a destination subscriber's number portion; Sa, an originating subscriber's number portion; C, a control data portion; Id, a data type identification portion; and M, a message portion.

The data type identification portion Id stores a code indicating a data type to be transmitted from a calling terminal apparatus. According to this code, the data type can be specified. More specifically, the first bit is a speech/non-speech data indication bit, the second bit is an automatic/manual call incoming (automatic/manual response) control indication bit, the third bit is an indication bit of the presence/absence of a message, and the like.

The message portion M stores a character string of a message input and edited by the key set section 41.

Communication start control (terminal apparatus interconnecting control) of this embodiment with the above arrangement will be described below with reference to FIGS. 6A to 6C and FIGS. 7 and 8A and 8B.

Figure 6A:
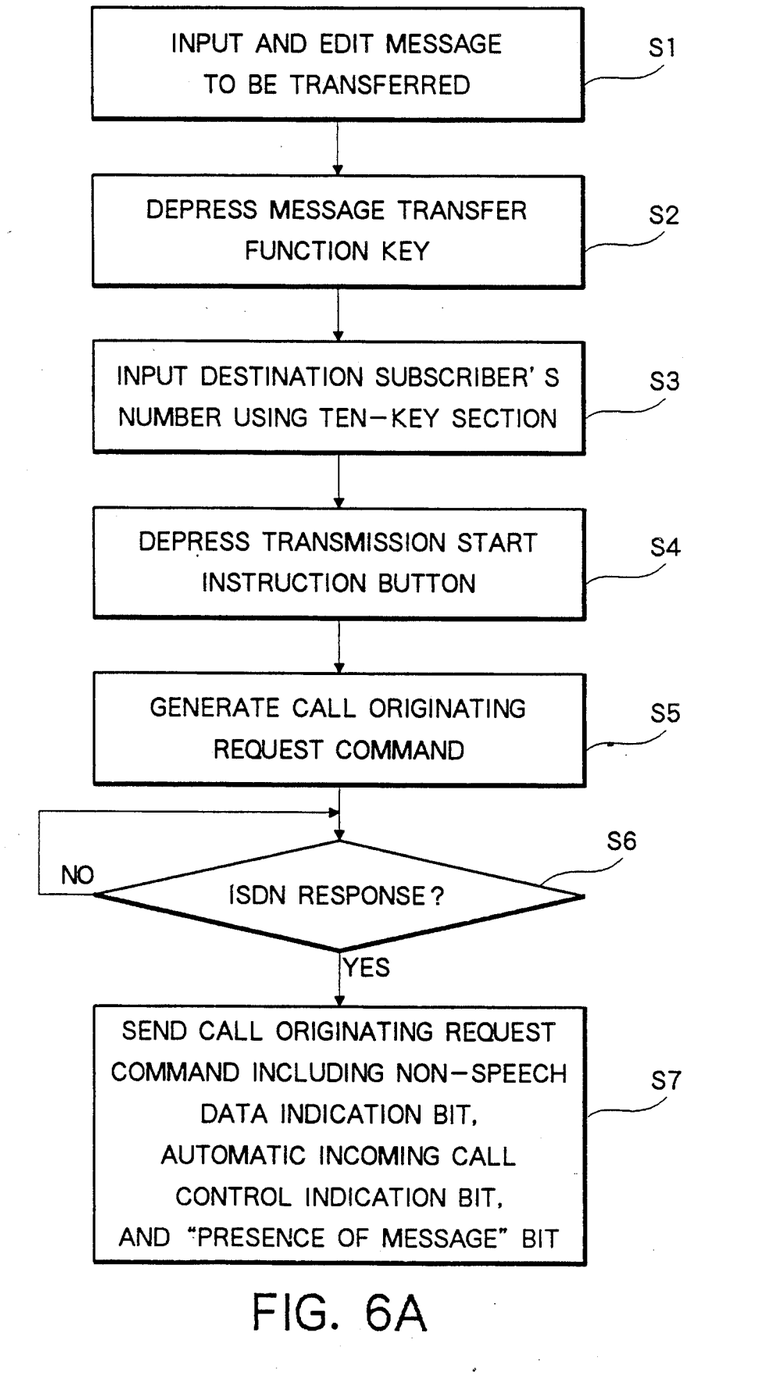
FIG. 6A is a flow chart when only message transfer is performed.
Figure 6B:
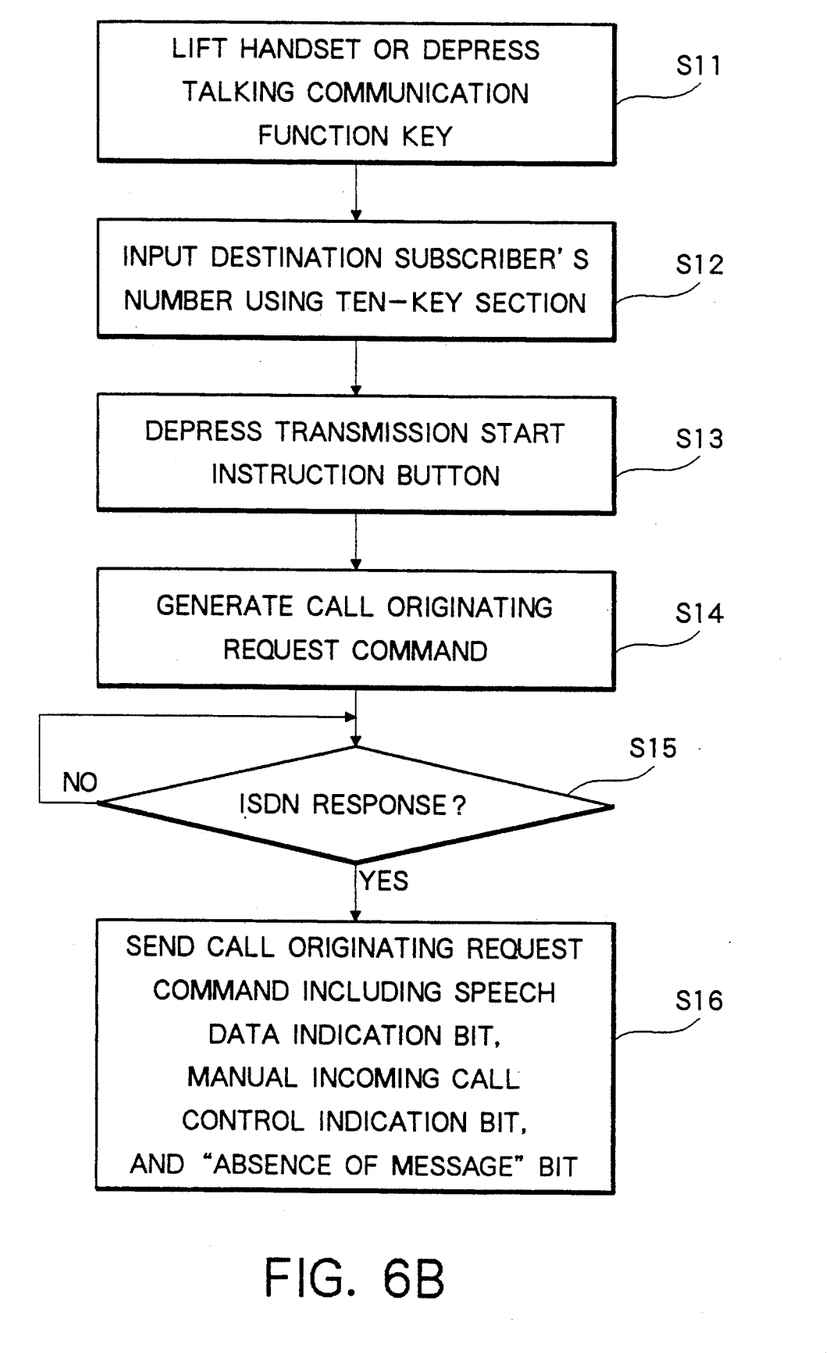
FIG. 6B is a flow chart showing call originating processing when only verbal communication is performed.

An operation sequence when a call originating operation is performed by the digital telephone apparatus as the terminal apparatus of this embodiment will be described first with reference to FIGS. 6A to 6C and FIGS. 7 and 8A, 8B. FIG. 6A shows a case wherein only "message transfer" using the message portion M is performed; FIG. 6B, a case wherein only "verbal communication" is performed without performing "message transfer" using the message portion M; and FIG. 6C, a case wherein both "message transfer" using the message portion M and "verbal communication" are performed.

A case will be described with reference to FIG. 6A wherein only "message transfer" is performed.

A calling party who originates a call to another communication terminal apparatus inputs and edits a message to be transferred using the key set section 41 while visually observing a display of input data, a processing result, and the like on the liquid crystal display 42, in step S1. In step S2, the calling party depresses the message transfer function key 40d to instruct that only a message is to be transferred. The CPU 32 which receives this message instructs the line I/F unit 35 to prepare for signal transmission onto the line, and waits for the next control data input. After the calling party inputs a called (destination) subscriber's number using the ten-key section 39 in step S3, he or she depresses the transmission start instruction button 40b in step S4. This subscriber's number is sent to the line I/F unit 35 through the I/O unit 37, and the line I/F unit 35 outputs a destination subscriber's number signal corresponding to the input number onto the control channel (D channel) of the ISDN bus line 38. The output signal is sent to the ISDN 25.

Figure 8A:
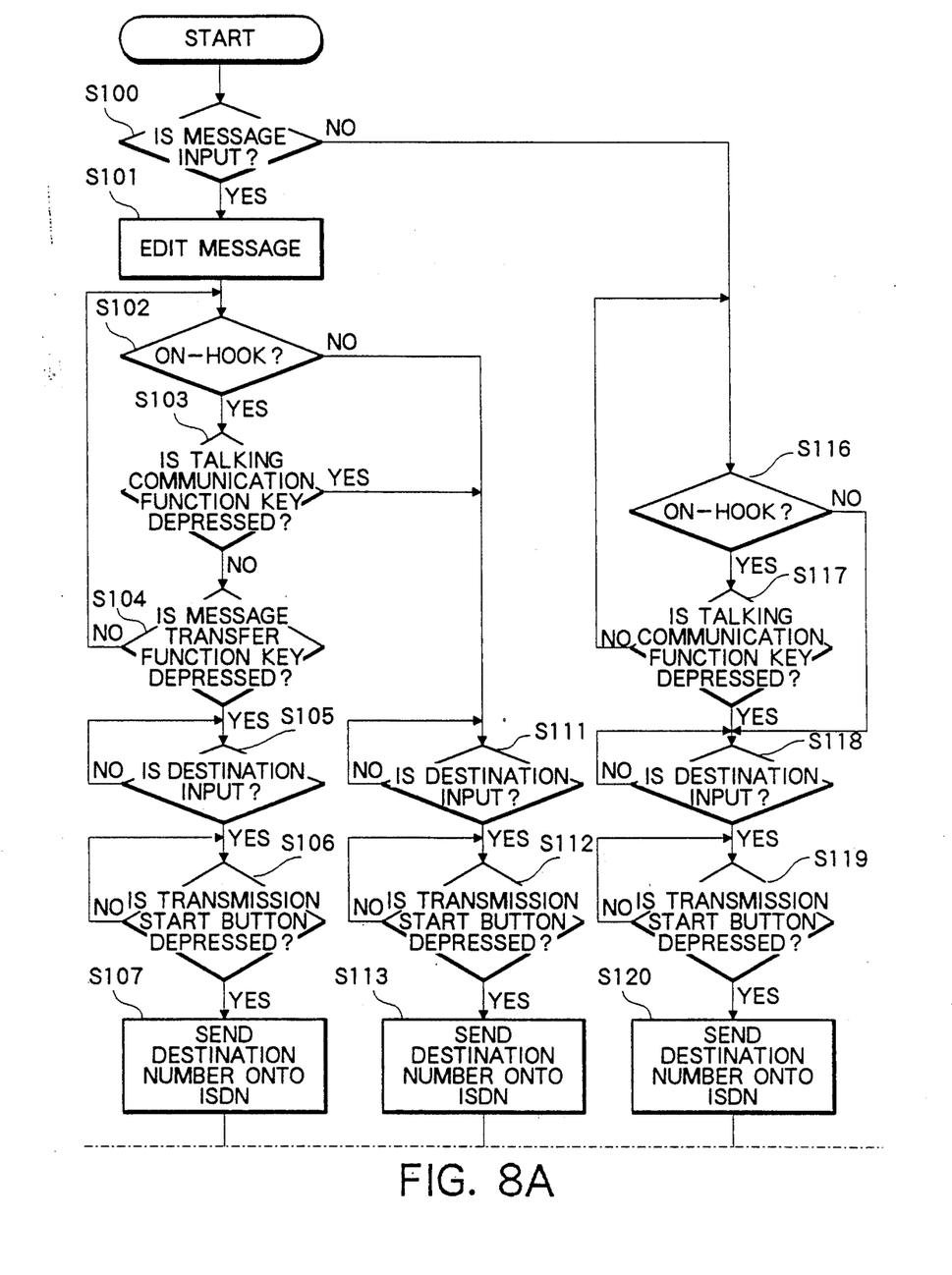
FIGS. 8A and 8B are is a flow chart showing processing of a CPU at that time.
Figure 8B:
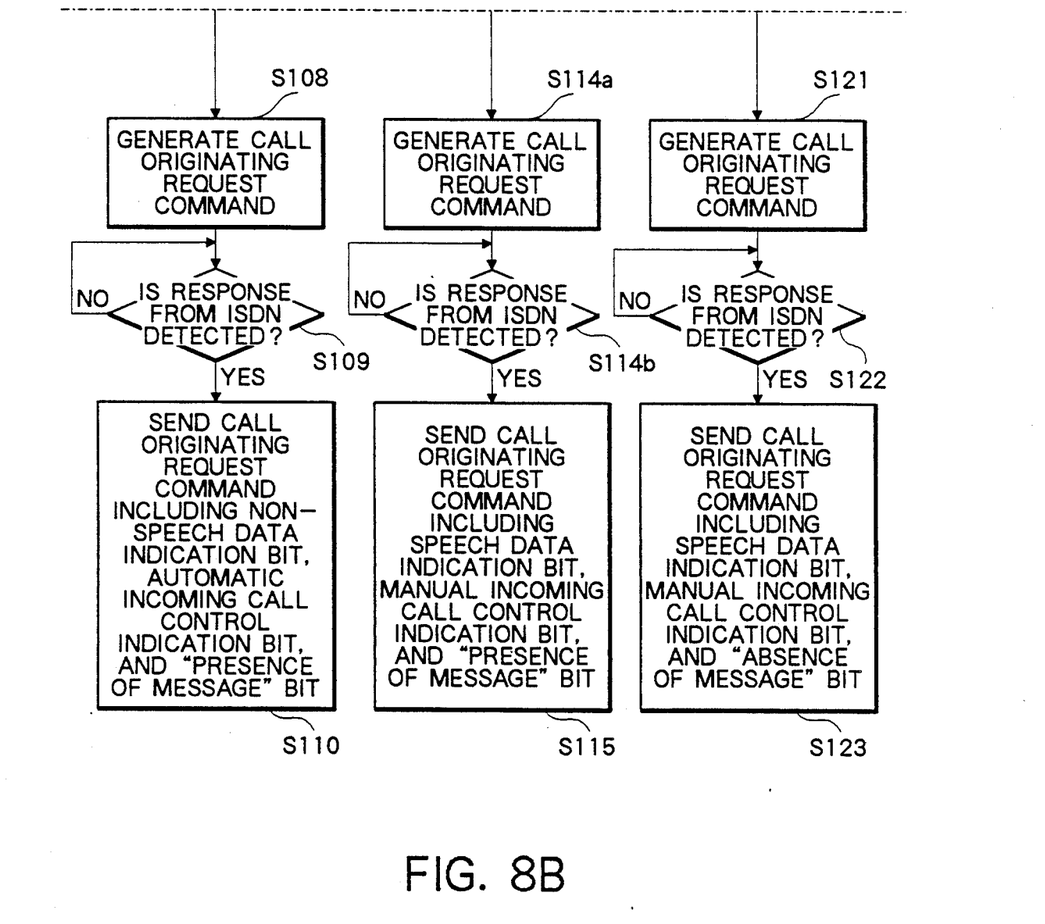

The CPU 32 generates a call originating request command (having the frame format shown in FIG. 5) on the basis of the above-mentioned sequence, in step S5. In this case, since only the message is transferred, in the data type identification portion Id, the first bit is set to be "1" (non-speech data), the second bit is set to be "1" (automatic call incoming indication), the third bit is set to be "1" (presence of message), and the like. In step S6, a response from the ISDN is waited. If the response from the ISDN is detected, the flow advances to step S7, and the call originating request command generated in step S5 is sent to the control channel (D channel) of the ISDN bus line 38 through the I/F unit 35. Thus, desired message data can be transferred to a desired destination apparatus. Steps S100 to S110 in FIG. 8A, 8B show control in the CPU 32 in this case.

A case will be described below with reference to FIG. 6B wherein only verbal communication is performed.

When only verbal communication is performed, the calling party need not input a message. Therefore, he or she takes up the handset 44 from the hook or depresses the verbal communication function key 40e to input an instruction indicating that verbal communication is to be performed. In response to this instruction, the CPU 32 causes the line I/F unit 35 to prepare for signal transmission to the line, and waits for the next control data input. The operator then inputs a destination subscriber's number using the ten-key section 39 in the same manner as in step S3 in step S12, and depresses the transmission start instruction button 40b in step S13. As a result, the subscriber's number is output to the control channel (D channel) of the ISDN bus line 38 as the destination subscriber's number signal corresponding to the input number, and is sent to the ISDN 25.

The CPU 32 generates a call originating request command (having the frame format shown in FIG. 5) on the basis of the above-mentioned sequence, in step S14. In this case, since only verbal communication is performed, in the data type identification portion Id, the first bit is set to be "0" (speech data), the second bit is set to be "0" (manual call incoming indication), the third bit is set to be "0" (absence of message), and the like. In step S15, the CPU 32 waits for a response from the ISDN. If the CPU 32 receives the response from the ISDN, the flow advances to step S16, and the call originating request command generated in step S14 is sent to the control channel (D channel) of the ISDN bus line 38 through the line I/F unit 35. In response to this command, the destination apparatus is set in a mode capable of verbal communication. For this reason, the call originating processing is ended, and thereafter, verbal communication is performed. Steps S100 and S116 to S123 in FIG. 8A, 8B show control in the CPU 32 in this case.

Figure 6C:
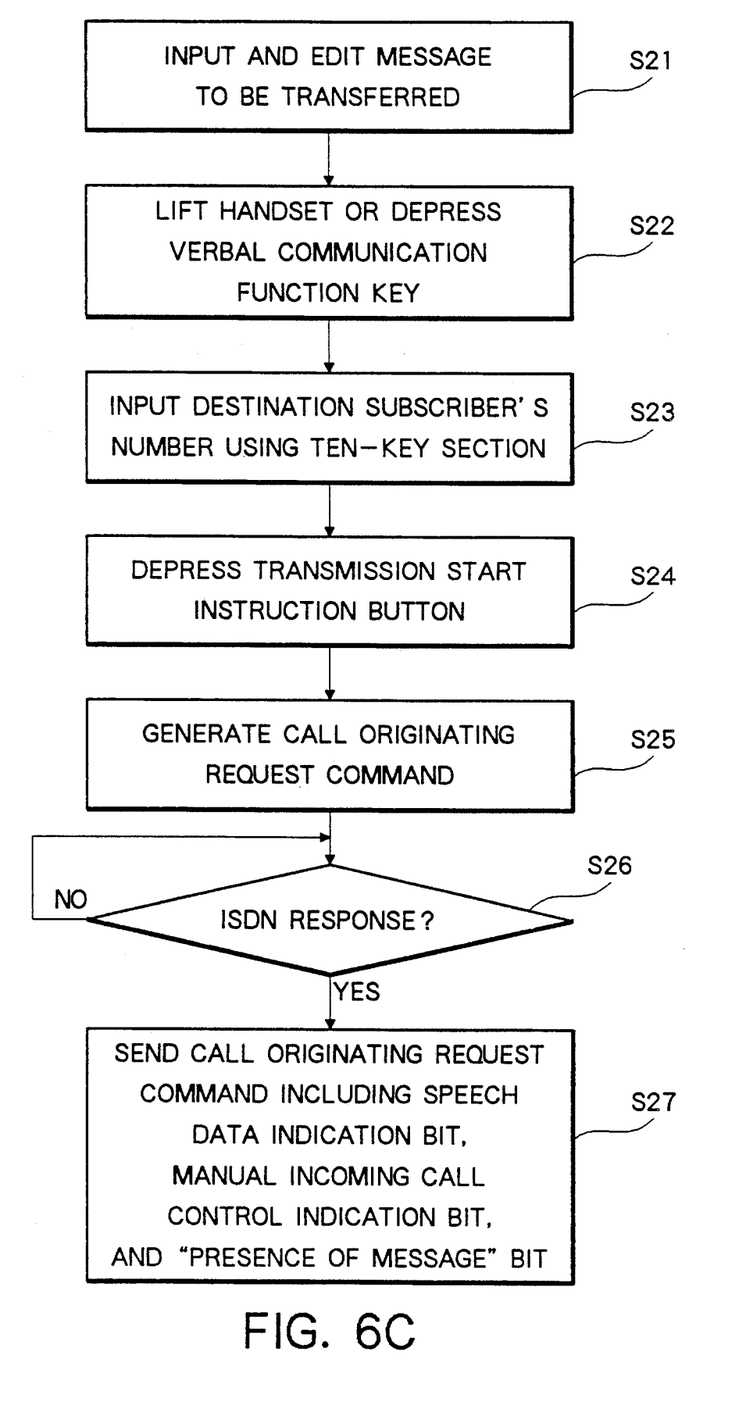
FIG. 6C is a flow chart showing call originating processing when message transfer and verbal communication are performed.

A case will be described below with reference to FIG. 6C wherein both message transfer and verbal communication are performed.

In step S21, the calling party inputs and edits a message to be transferred using the key set section 41 while observing the liquid crystal display 42 in the same manner as in step S1. In step S22, the calling party takes u the handset 44 from the hook or depresses the verbal communication function key 40e to input a instruction indicating that verbal communication is to be performed. In response to this instruction, the CPU 32 causes the line I/F unit 35 to prepare for signal transmission to the line, and waits for the next control data input. The operator inputs the destination subscriber's number as in step S3 in step S23, and depresses the transmission start instruction button 40b in step S24. As a result, the subscriber's number is output to the control channel (D channel) of the ISDN bus line 38 as the destination subscriber's number along the same path as in step S4, and is set to the ISDN 25.

The CPU 32 generates a call originating request command (having the frame format shown in FIG. 5) on the basis of the data obtained in the above-mentioned sequence, in step S25. In this case, since both message transfer and verbal communication are performed, in the data type identification portion Id, the first bit is set to be "0" (speech data), the second bit is set to be "0" (manual call incoming indication), the third bit is set to be "1" (presence of message), and the like. In step S26, the CPU 32 waits for a response from the ISDN. If the CPU 32 receives the response from the ISDN, it sends the call originating request command generated in step S27 to the control channel (D channel) of the ISDN bus line 38 through the line I/F unit 35. Steps S100 to S103 and S111 to S115 in FIG. 8A, 8B show control in the CPU 32 in this case.

The call originating processing is ended, and a communication path with a destination apparatus is formed. Message transfer using the message portion M is performed using a known communication sequence, and when the receiving party takes off the handset from the hook, verbal communication with the receiving party can be performed.

Generation of the call originating request command in steps S5, S14, and S25 can be performed before the destination subscriber's number is sent.

Figure 7:
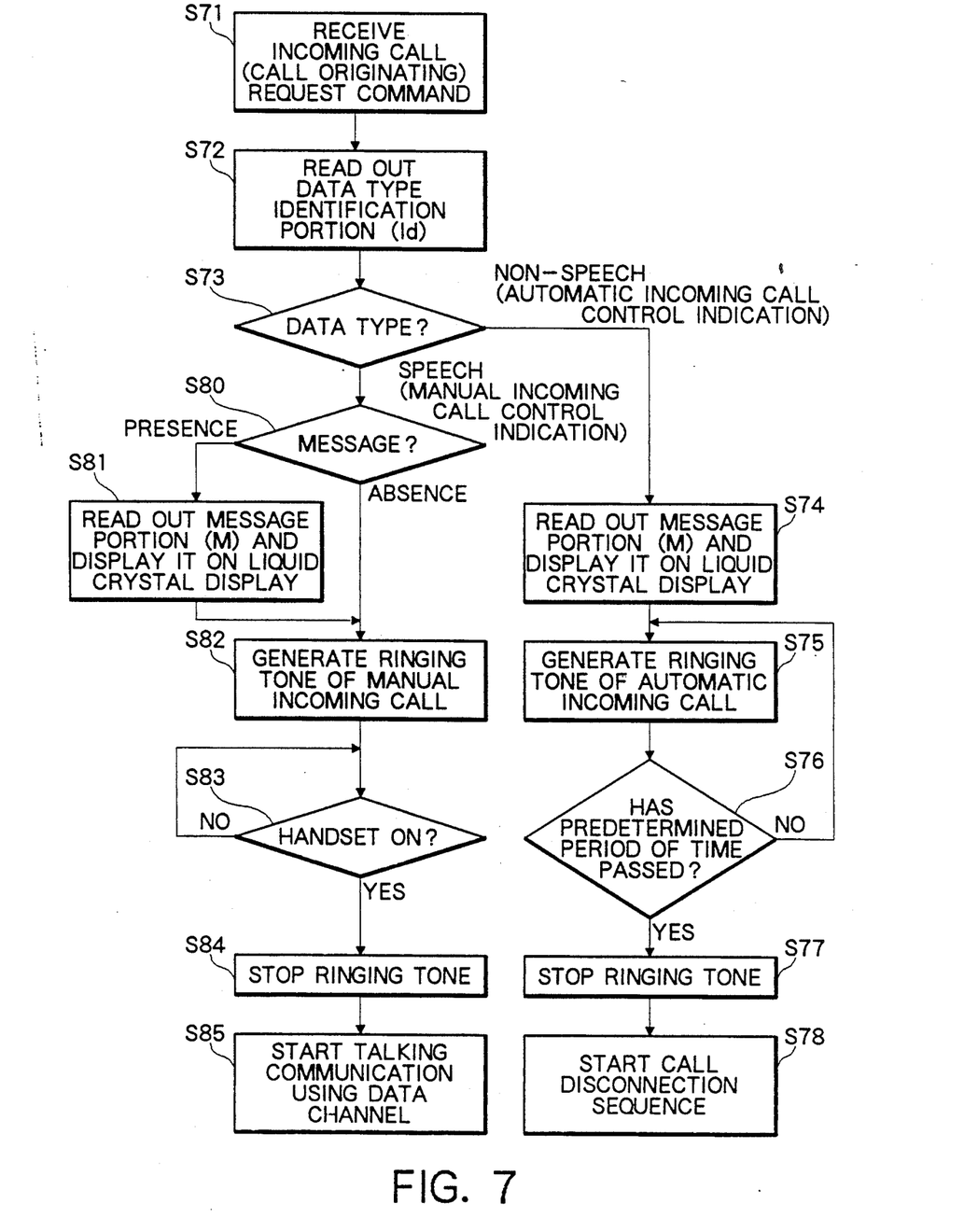
FIG. 7 is a flow chart showing call incoming processing of a called apparatus.

Finally, communication path formation control in a called apparatus as a destination apparatus called in the above-mentioned sequence will be described below with reference to FIG. 7.

Control in a called (call incoming side) apparatus is started upon reception of the call originating request command from the calling apparatus through the control channel (D channel) of the connecting line 23, in step S71. The data type identification portion (Id) in the call originating request command includes three data types, i.e., the case wherein only message transfer is performed, the case wherein only verbal communication is performed, and the case wherein both message transfer and verbal communication are performed, as shown in FIGS. 6A to 6C. For this reason, in step S72, the received data type identification portion (Id) is read out.

In step S73, the first and second bits of the portion (Id) are checked to discriminate speech data/non-speech data and manual incoming call/automatic call incoming indication. In the apparatus of this embodiment, when the speech data is sent, the manual call incoming indication mode is designated; when the non-speech data is sent, the automatic call incoming indication mode is designated.

If it is determined in step S73 that the non-speech data is detected, since only message transfer is performed, the flow advances to step S74. In step S74, the message portion (M) in the call originating request command is read out, and the readout content is displayed on the liquid crystal display 42. In step S75, in order to signal that an incoming call is detected and the non-speech data transfer request is generated, the loudspeaker 43 is driven to generate a ringing tone. The ringing tone has a different intermittent period and output frequency from one generated when an incoming call of speech data is to be signaled, as will be described later, so as to be easily discriminated therefrom. A person who hears this ringing tone can discriminate whether message transfer or verbal communication by means of speech is performed. In this case, since automatic call incoming processing is performed, it is checked in step S76 if a predetermined period of time has passed. If NO in step S76, the flow returns to step S75, and the ringing tone is continued. However, if YES in step S76, the flow advances from step S76 to step S77, and the ringing tone is automatically stopped. Thereafter, a call disconnection sequence is started in step S78, and upon completion of the disconnection sequence, a series of processing operations ar completed.

With the above-mentioned sequence, when a receiving party hears the ringing tone, he or she can recognize that an incoming call of the message transfer request is generated, and can read a message displayed on the liquid crystal display 42.

On the other hand, if it is determined in step S73 that it is speech data as the verbal communication request, the flow advances to step S80. When verbal communication is performed, since message transfer may often be simultaneously selected, the third bit in the data type identification portion (Id) is checked to discriminate the presence/absence of a message. If the absence of a message is determined, the flow advances to step S82; otherwise, the flow advances to step S81. In step S81, the content of the message portion (M) is displayed on the liquid crystal display 42, and the flow advances to step S82.

In step S82, a ringing tone for signaling that an incoming call with the verbal communication request is generated and outputted from the loudspeaker 43. The ringing tone has a different intermittent period and output frequency from one for an incoming call of non-speech data with no verbal communication request described above so as to be easily discriminated therefrom. In this case, manual call incoming control (manual response) must be performed, and in step S83, off-hook of the handset 44 by a receiving party who hears the ringing tone is waited. When the handset 44 is taken up from the hook, the flow advances to step S84, and the ringing tone is stopped. For this reason, the ringing tone is intermittently output until the receiving party takes up the handset 44 from the hook, and the receiving party can know based on the ringing tone that an incoming call with the verbal communication request is generated.

In this case, if a message transfer request is also detected and a message is added, the transferred message is displayed on the liquid crystal display 42. For this reason, when the receiving party takes off the handset 44 from the hook to answer the phone, he or she can read the message from the calling party. Thereafter, verbal communication is started using the data channel (B channel) in step S85. Note that the transferred message displayed on the liquid crystal display 42 need only be deleted when verbal communication of the handset 44 is hunged up, but may be deleted immediately after the handset 44 is hunged up.

According to this embodiment described above, when verbal communication is to be performed, a calling party can add and transfer a message to a receiving party.

For this reason, the name of a particular receiving party of a plurality of receiving parties who utilize a called terminal apparatus can be transmitted as a message in the call originating request command. Therefore, the content of the message is displayed on the liquid crystal display 42 of the call incoming side apparatus which receives this call originating request command, and a person, whose name is displayed, of a plurality of users can take up the handset 44 from the hook and answer the phone.

With the above control, a time-consuming answering operation by somebody who may or may not be the intended receiving party can be omitted.

As described above, according to the terminal apparatus of this embodiment, the ringing tone upon detection of an incoming call is changed and output based on code data stored in the data type identification portion Id in the call originating request command. Thus, a receiving party need only hear this ringing tone and can easily discriminate whether only message transfer is performed and verbal communication is not required or verbal communication must be performed and the handset 44 must be taken up from the hook.

As described above, according to the present invention, data is sent to a called (call incoming side) apparatus during a communication path formation operation with a desired destination apparatus through a communication medium and can be displayed on the destination apparatus. Thus, a response can be efficiently made without requiring unnecessary answering processing.

Communication type identification data is sent to a called (call incoming side) apparatus during a communication path formation operation with a desired destination apparatus through a communication medium. The destination apparatus can discriminate the identification data to generate different ringing tones in correspondence with the communication types. Thus, a receiving party can easily distinguish the communication type, and can take an appropriate reaction.

(Another Embodiment)

The data type stored in the message portion of the call originating request command is not limited, but need only be one which can be input/encoded or decoded/output at the calling and called terminal apparatuses.

In the above-mentioned embodiment, data is a character string. However, the present invention is not limited to this, and a melody code used in a MIDI can be reproduced from the loudspeaker 43 of the called terminal apparatus, or various other data may be used.

In addition, various additional data can be transferred, resulting in great practical advantages.

The present invention can be applied to a facsimile apparatus with a telephone set which is presently commercially available as a terminal apparatus of the telephone network, and can also be easily applied to an ISDN terminal.

In this case, a called (receiving) terminal discriminates (speech data/non-speech data) or (automatic reception indication/manual reception indication) based on the content of the data type identification portion Id of a call originating request command, and changes and outputs a ringing tone in response to an incoming call to the self terminal in accordance with the discrimination result. For this reason, a receiving party can easily distinguish whether verbal communication using the handset 44 (verbal communication request) is performed or reception of image data originated to the facsimile apparatus, and can quickly answer the phone when the verbal communication request is made.

In this case, even when an automatic reception (automatic incoming call) mode is set, the ringing tone may be kept output until a response is made using the handset 44.

As many apparently widely different embodiments of the present invention can be made without departing from the spirit and scope thereof, it is to be understood that the invention is not limited to the above specific embodiments thereof except as defined in the appended claims.

I claim:

1. A communication system which is connected through ISDN having at least one data channel and a control channel, and transfers a call control signal using the control channel, comprising;
   receiving means for receiving a control signal including a call originating request command from said control channel, the call originating request command starting a call connection with a called terminal apparatus;
   analyzing means for analyzing the control signal received by said receiving means; and
   display means for displaying a received message,
   wherein a calling terminal apparatus adds a message destined to the called terminal apparatus to the call originating request command and sends the call originating request command, and when said analyzing means of said called terminal apparatus detects the call originating request command from said calling terminal apparatus contents of the message included in a message portion in the call originating request command are displayed on said display means during a call incoming operation before a call connection between the call terminal apparatus and the called terminal apparatus.

2. A system according to claim 1, wherein said message displayed on said display means includes information indicating the destined receiver.

3. A system according to claim 1, wherein said called terminal apparatus comprises signaling means for signaling reception of the command by means of an acoustic signal.

4. A communication terminal apparatus comprising:
   receiving means for receiving a call originating request command which starts a call connection sent from another communication apparatus through ISDN;
   discriminating means for analyzing said call originating request command received by said receiving means and for discriminating whether or not a call connection by an operator is necessary; and
   output means for outputting an acoustic signal corresponding to a discriminating result of said discriminating means,
   wherein when said receiving means detects the call originating request command from said another communication apparatus, said output means changes and outputs the acoustic signal corresponding to said discrimination result of said discriminating means so that said discriminating means discriminates whether or not said call connection by an operator is necessary.

5. A communication system comprising:
   receiving means for receiving a call originating request command sent from another communication apparatus through a line;

analyzing means for analyzing call originating processing type data in said call originating request command; and output means for outputting an acoustic signal corresponding to an analysis result of said analyzing means, wherein when said receiving means detects said call originating request command from said another communication apparatus, said output means outputs the acoustic signal corresponding to said call originating processing type data in said call originating request command, the call originating processing type data in the call originating request command includes identification data of a speech communication processing type and a non-speech communication processing type, and said output means outputs the acoustic signal so that the presence/absence of the speech communication processing can be discriminated.

6. A communication system comprising:

receiving means for receiving a call originating request command which starts a call connection from another communication apparatus through ISDN;

analyzing means for analyzing whether or not the call originating request command received by said receiving means includes a message; and display means for displaying the received message, wherein said display means discriminates said received message included in said call originating request command and displays the content of said received message during a csll incoming operation before said call connection with said another communication apparatus.

7. A system according to claim 6, wherein said message displayed on said display means includes information indicating the destined receiver.

8. A communication terminal apparatus which is connected to another communication apparatus through a communication medium having at least one data channel and a control channel, and transfers a call control signal using said control channel, comprising:

receiving means for receiving a control signal from said control channel;

analyzing means for analyzing the control signal by said receiving means;

display means for displaying a received message; and output means for outputting an acoustic signal corresponding to an analysis result of said analyzing means, wherein a calling terminal apparatus adds call originating processing type data in a call originating request command and sends the call originating request command, and when said analyzing means of said called terminal apparatus detects the call originating request command from said calling terminal apparatus, said output means outputs an acoustic signal corresponding to the call originating processing type data in the call originating request command, and when message data is included in the call originating request command, said display means is caused to display the received message, wherein said call originating processing type includes a speech communication processing type and a nonspeech communication processing type, and said output means outputs the acoustic signal so that the presence/absence of the speech communication processing can be discriminated.

9. An apparatus according to claim 8, wherein said calling terminal apparatus adds a message portion destined to said called terminal apparatus in the call originating request command, and when said analyzing means of said called terminal apparatus detects the call originating request command from said calling terminal apparatus, a content of the message stored in the message portion in the call originating request command is displayed on said display means during a call incoming operation.

* * * * *

UNITED STATES PATENT AND TRADEMARK OFFICE
CERTIFICATE OF CORRECTION

PATENT NO. : 5,001,709
DATED : March 19, 1991
INVENTOR(S) : MAKOTO SATOH

It is certified that error appears in the above-identified patent and that said Letters Patent is hereby corrected as shown below:

COLUMN 4

Line 64, "arrangement." should read --arrangement belongs.--.

COLUMN 6

Line 61, "u" should read --up--.

COLUMN 10

Line 14, "and" should read --and which--.
Line 26, "to" should read --for--.
Line 31, "apparatus" should read --apparatus,--.
Line 55, "discriminating" should read --discrimination--.

COLUMN 12

Line 1, "and" should read --and which--.
Line 32, "to" should read --for--.

Signed and Sealed this

Seventh Day of December, 1993

Attest:

BRUCE LEHMAN

*Attesting Officer*   *Commissioner of Patents and Trademarks*